United States Patent
Chen et al.

(10) Patent No.: US 11,164,348 B1
(45) Date of Patent: Nov. 2, 2021

(54) SYSTEMS AND METHODS FOR GENERAL-PURPOSE TEMPORAL GRAPH COMPUTING

(71) Applicant: Tsinghua University, Beijing (CN)

(72) Inventors: Kang Chen, Beijing (CN); Yongwei Wu, Beijing (CN); Chengying Huan, Beijing (CN); Mengxing Liu, Beijing (CN); Jinlei Jiang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 26 days.

(21) Appl. No.: 16/914,700

(22) Filed: Jun. 29, 2020

(51) Int. Cl.
*G06T 11/20* (2006.01)
*G06F 17/16* (2006.01)

(52) U.S. Cl.
CPC ........... *G06T 11/206* (2013.01); *G06F 17/16* (2013.01)

(58) Field of Classification Search
CPC ................................ G06T 11/20; G06F 17/16
See application file for complete search history.

(56) References Cited

U.S. PATENT DOCUMENTS

| | | | |
|---|---|---|---|
| 8,578,389 B1 * | 11/2013 | Boucher | G06F 9/4494 718/106 |
| 2011/0004581 A1 * | 1/2011 | Schmidt | G06F 17/11 706/55 |

* cited by examiner

*Primary Examiner* — Michelle L Sams
(74) *Attorney, Agent, or Firm* — IPRO, PLLC; Xiaomin Huang (57) ABSTRACT

Systems and methods are provided for performing temporal graph computing. One method may comprise receiving an input temporal graph that have a plurality of edges with each edge connecting from one vertex instance to another vertex instance, generating in-vertices and out-vertices for each vertex instance, merging the in-vertices and out-vertices into hub vertices for each vertex instance and generating a directed acyclic graph (DAG), receiving a minimum path problem, and scanning the DAG once to provide a solution to the minimum path problem. The merging of vertices and generation of the DAG may be performed by sorting all out-vertices using a 2-dimensional radix sort, generating a respective set of hub vertices for each vertex instance, relabeling the in-vertices and the out-vertices to their respective hub vertices for each vertex instance by a parallel binary search and updating edges affected by the relabeling, and assembling relabeled edges and vertices.

20 Claims, 6 Drawing Sheets

SYSTEMS AND METHODS FOR GENERAL-PURPOSE TEMPORAL GRAPH COMPUTING

TECHNICAL FIELD

The disclosure herein relates to graph computing, particularly relates to graph computing for temporal graphs that have timing information attached to edges.

BACKGROUND

Graph computing is widely used in a large number of every applications. Temporal graphs, which label the edges with time intervals, can provide additional capabilities to describe the time-critical applications that can not otherwise be captured by traditional static graph computing engines. In modern everyday life, many important applications, such as aviation networks, social networks, e-commerce networks, are based on temporal graphs. In the era of deep learning based big data analytics, effectively extracting essential information from large and complex temporal graphs become increasingly critical for everyday life.

Most applications using or represented by temporal graph focus on solving the temporal path problem. A temporal path may be a legitimate path under time constraints. A legitimate path may be a path through vertices in a temporal graph that satisfy timing and connection constraints. For example, to find a temporal path in an aviation network, the arrival time must be earlier than the departure time at each transit airport. There are several typical temporal path problems such as reachability (i.e., whether there is a temporal path between two airports); fastest path (i.e., how to reach the destination as fast as possible); and shortest path (i.e., how to reach the destination with the lowest total cost).

Figure 1A:
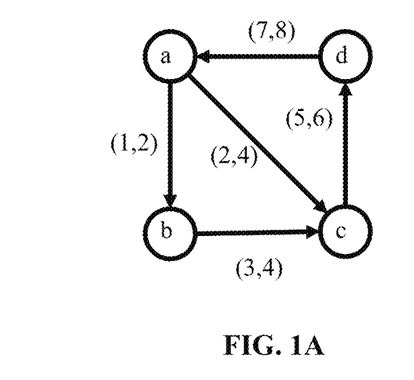
FIG. 1A schematically shows a temporal graph of an aviation map.
Figure 1B:
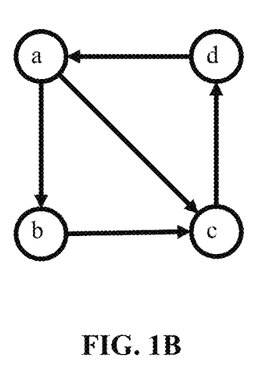
FIG. 1B schematically shows a static graph by removing the time constraints from the temporal graph of FIG. 1A.

Despite its importance, high performance graph computing remains a challenge, especially for large-scale graphs. Two previous methods have been proposed to address the temporal path problems. Firstly, a traditional approach is to degenerate a temporal graph into its original static graph by removing all the time intervals, which is referred as the static method. FIG. 1A shows a temporal graph of an aviation map with a, b, c and d four locations and arrowed connections indicating flights between to connected locations (departure time, arrival time). FIG. 1B illustrates the static version of the temporal graph of FIG. 1A with the time intervals removed. To correctly process this static version, various time constraints must be taken into consideration. For instance, the static graph shown in FIG. 1B has a path from d to c via a (i.e., d→a→c). However, this path is meaningless because the arrival time of the flight d→a is later than the departure time of the flight a→c. Enforcing time constraints when processing the static graph does ensure correctness but often leads to higher performance overhead.

Figure 1C:
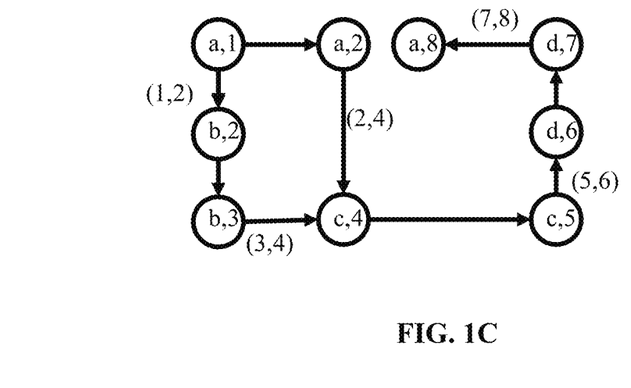
FIG. 1C schematically shows a transformed graph transformed from the temporal graph of FIG. 1A by embedding timing constraints in the temporal graph of FIG. 1A.

Secondly, another technique (named transformation method) transforms the original temporal graph to an equivalent but larger graph by expanding each vertex to multiple vertices according to the number of the starting and the ending time information. FIG. 1C gives an example of such transformation for FIG. 1A. The topological structure of the transformed graph contains all the necessary timing constraints. Moreover, if there is a temporal path in the original temporal graph, there must exist a corresponding "static path" on the transformed graph. This avoids additional costs for enforcing time constraints for correctness. Traditional graph algorithms can be directly applied to the transformed graph. However, the current transformation approach has the following limitations. (1) It may introduce many redundancies in the transformed graph, resulting in large storage overhead. For instance, the number of vertices and edges in FIG. 1C are almost twice of the number of vertices and edges in FIG. 1A. (2) The actual creation of the transformed graph can be time-consuming. For example, the existing works need to sort all the vertices during the transformation. For a 30 GB graph, it takes about 20 minutes on a 16-core Intel Xeon (R) CPUs to build the transformed graph itself (i.e., preprocessing phase). (3) Upon the actual graph processing, the generated topological order in the transformed graph is not well utilized to further reduce the overall system latency.

Therefore, the state-of-the-art approaches lead to higher overall system latency and large storage consumption. At the system level, unlike the general frameworks for processing static graphs, the current proposals on temporal graph processing typically apply a variety of suboptimal ad-hoc algorithms according to specific application features. Moreover, lack of general-purpose support at both algorithm and system level makes users suffer from both redundant development efforts and poor performance. Accordingly, there is a need for a general-purpose temporal graph computing system and method that effectively addresses temporal path problems.

SUMMARY

The present disclosure provides systems and methods for temporal graph computing. Embodiments according to the present disclosure provide a highly efficient graph transformation-based solution and programming interface to significantly reduce programming efforts and computing cost. In an exemplary embodiment, there is provided a method that may comprise receiving an input temporal graph that have a plurality of edges with each edge connecting from one vertex instance another vertex instance of the plurality of vertices, generating in-vertices and out-vertices for each vertex instance of the plurality of vertices, merging the in-vertices and the out-vertices into hub vertices for each vertex instance and generating a directed acyclic graph (DAG), receiving a minimum path problem, and scanning the DAG once to provide a solution to the minimum path problem. The merging of vertices and generation of the DAG may be performed by sorting all out-vertices for the plurality of vertices using a 2-dimensional radix sort, generating a respective set of hub vertices for each vertex instance, relabeling the in-vertices and the out-vertices to their respective hub vertices for each vertex instance by a parallel binary search and updating edges affected by the relabeling and assembling relabeled edges and vertices to generate the DAG.

In another exemplary embodiment, there is provided a computing system that may comprise a main memory for storing software instructions for performing temporal graph computing and a central processing unit (CPU) coupled to the main memory and configured to execute the software instructions to: receive an input temporal graph that have a plurality of edges with each edge connecting from one vertex instance to another vertex instance of a plurality of vertices, generate in-vertices and out-vertices for each vertex instance of the plurality of vertices, merge the in-vertices and the out-vertices into hub vertices for each vertex instance and generate a directed acyclic graph (DAG), receive a minimum path problem and scan the DAG once to provide a solution to the minimum path problem. The vertices may be merged and the DAG may be generated by:

sorting all out-vertices for the plurality of vertices using a 2-dimensional radix sort, generating a respective set of hub vertices for each vertex instance, relabeling the in-vertices and the out-vertices to their respective hub vertices for each vertex instance by a parallel binary search and updating edges affected by the relabeling, and assemble relabeled edges and vertices to generate the DAG.

In yet another exemplary embodiment, there is provided one or more computer-readable non-transitory media comprising one or more instructions that when executed by one or more processors is to configure the one or more processors to perform operations comprising: receiving an input temporal graph that have a plurality of edges with each edge connecting from one vertex instance another vertex instance of the plurality of vertices, generating in-vertices and out-vertices for each vertex instance of the plurality of vertices, merging the in-vertices and the out-vertices into hub vertices for each vertex instance and generating a directed acyclic graph (DAG), receiving a minimum path problem, and scanning the DAG once to provide a solution to the minimum path problem. The merging of vertices and generation of the DAG may be performed by sorting all out-vertices for the plurality of vertices using a 2-dimensional radix sort, generating a respective set of hub vertices for each vertex instance, relabeling the in-vertices and the out-vertices to their respective hub vertices for each vertex instance by a parallel binary search and updating edges affected by the relabeling and assembling relabeled edges and vertices to generate the DAG.

DETAILED DESCRIPTION

Specific embodiments according to the present disclosure will now be described in detail with reference to the accompanying figures. Like elements in the various figures are denoted by like reference numerals for consistency.

Figure 2:
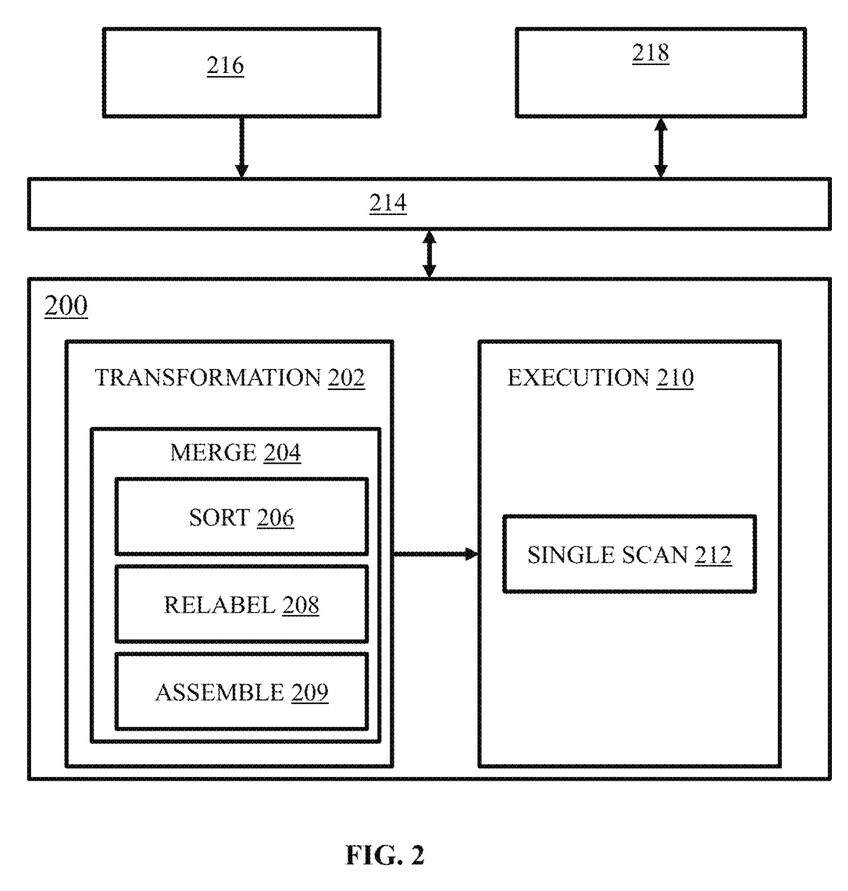
FIG. 2 schematically shows a computing system for temporal graphs in accordance with an embodiment of the present disclosure.

The present disclosure provides systems and methods for temporal graph computing. FIG. 2 schematically shows a computing system 200 according to an embodiment. The computing system 200 may comprise a transformation module 202 and an execution module 210, and expose an Application Programming Interface (API) 214. A temporal graph 216 may be input to the system 200 through the API 214 and a user application 218 may also access the system 200 via the AIP 214. The temporal graph 216 may be any temporal graph that have timing constraints, for example the temporal graph of FIG. 1A. The user application 218 may be any application, for example, a travel booking application, a social networking application or an e-commerce application, that may provide services based on temporal graph (e.g., temporal graph 216).

In one embodiment, the system 200 may use a data model that may refer to a graph as G(E; V), where E may be the edges set and V may be the vertices set. An edge "e" of the edges set E may be denoted as a quad-tuple (u; v; s; t), where u and v may be vertices of the vertices set V, and there exists an edge from u to v starting at time s (e.g., start(e)) and ending at time t (e.g., end(e)). A vertex in the vertices set V that have no timing information may be referred to as a vertex instance. For the graph with costs, a weight value w may be attached to the edge to form a quintet (u; v; s; t; w). For simplicity, it may be assumed that all elements are meaningful (e.g., s<t). There may be multiple edges between the same pair of vertices. In-degree and out-degree may be denoted as $d_{in}[v]$ and $d_{out}[v]$ respectively. D may be used to denote the maximum in-degree or out-degree in the graph. In some embodiments, there may be user-defined properties for the vertices, which may be modified according to their incoming edges.

In the system 200, an input temporal graph may be transformed in the transformation module 202 to generate a directed acyclic graph (DAG) and the generated DAG may be passed to the execution module 210 to provide path solutions in the input temporal graph. In various embodiments, the execution module 210 may provide solutions to the user application 218 for one or more of common path problems, such as, but not limited to, reachability (e.g., whether there is legitimate route between a start point and an end point), earliest-arrival path, latest-departure path, fastest path, and shortest path.

In one embodiment, the transformation module 202 may include a merge sub-module 204. In some embodiments, an input temporal graph may be transformed to a static DAG with new identifiers assigned to vertices and edges. Two vertices may be generated in the new graph for each edge. For example, an edge from u to v in the input temporal graph represented by a quintet (u; v; s; t; w) may generate two vertices: $(u; s)_{out}$ (e.g., an out-vertex) and $(v; t)_{in}$ (e.g., an in-vertex) in the transformed graph. Each vertex (out-vertex or in-vertex) in the transformed graph may have a label (u; t) where u may be the vertex instance and t may be the time instance.

In various embodiments, the original graph G may be transformed to a new graph G'. A vertex instance v now may have a set of in-vertices $T_{in}[v]$ and a set of out-vertices $T_{out}[v]$ in G'. All elements in $T_{in}[v]$ may be unique, and all elements in $T_{out}[v]$ may be unique. If two or more in edges have the same end time, only one in-vertex may be generated. If two or more out edges have the same start time, only one out-vertex may be generated. The vertices set in G' may be V', which may include all $T_{in}[v]$ and $T_{out}[v]$ for each vertex instance v in the original graph G.

In some embodiments, during transformation, edges in G' may be generated by three rules. Rule 1, all edges in the original temporal graph G may be directly included in G'. Rule 2, for each tuple (v; $t_i$) (with the subscript index "i" in the range from 1 to k including 1 and k) of a vertex v in the in-vertices set $T_{in}[v]=\{(v; t_1); (v; t_2); \ldots; (v; t_{k+1})\}$, a directed edge from (v; $t_i$) to (v; $t_{i+1}$) may be created with weight 0, and edges also created from $T_{out}[v]$ in the same way. Rule 3, for a vertex v, a direct edge from a tuple (v, $t_x$) in the in-vertices set to a tuple (v, $t_y$) in the out-vertices set when $t_y$ is the earliest time to leave the vertex v after $t_x$. In some embodiments, the new edges created according to the transformation rules may be referred to as virtual edges because they do not exist in the original temporal graph, and the edges in the original temporal graph may be referred to as original edges.

In a transformed graph, some temporal path problems may be treated as prefix-optimum path problems. In general, graph computing tries to find an optimal legitimate path between a start vertex u and an end vertex v through a plurality of intermediate vertices $v_2, \ldots, v_n$. A legitimate path in the original temporal graph may be defined as P={u; $v_1$; $v_2$; ... ; $v_n$; v}. In a transformed graph with timing constraints, a legitimate path may be defined as P={(u; $t_1$); ... ; (v; $t_k$)}. All minimum path problems may be described using a target function target(P) on the path P. If there are more than one legitimate path between two vertices in a graph (temporal graph or static graph), the problem is to find the path P with minimum target(P), which may be defined as $Target_{min}(P(u; v))=\min\{target(P): P\in P(u; v)\}$. A path P is a minimum path between u and v if target(P)=$Target_{min}(P(u; v))$.

For some applications, each prefix of the final result (a sub-path) may also be the optimum of the sub-problem, that is, a prefix-optimum-path. That is, if the path P={u; $v_1$; $v_2$; ... ; $v_n$; v} may be a minimum path between u and v, for any intermediate vertex $v_k$ with k≤n, the path $P_k$={u; $v_1$; $v_2$; ... ; $v_k$} may also be the a minimum path between u and $v_k$. For example, the shortest path in a static graph is a prefix-optimum path, thus greedy algorithms like Dijkstra's algorithm can be used. However, in the temporal graph, because of time constraints, the shortest path is not prefix-optimum. That's why existing works try to find application-specific algorithms.

Interestingly, when the temporal graph is transformed into a static DAG, minimum path problems may become prefix-optimum. All legitimate paths in G' may be described as follows: P={(u; $t_1$); ... ; (v; $t_k$)}. Several common path problems, for example, reachability, earliest-arrival path, latest-departure path, fastest path, and shortest path, may become prefix-optimum path problems in the transformed graph. The target functions for these problems are listed as follows.

For reachability: target(P)=0 for all legitimate paths. That is, any legitimate paths are valid solution because the only requirement is to reach the end vertex from the start vertex. For earliest-arrival path: target(P)=$t_k$, where $t_k$ may be the time instance of the end vertex. For latest-departure path: target(P)=$t_1$, where $t_1$ may be the time instance of the start vertex in the path. For fastest path: target(P)=$t_k-t_1$, where $t_k$ may be the time instance of the end vertex and $t_1$ may be the time instance of the start vertex. For shortest path: target(P)=$\Sigma w_i$, where $w_i$ may be the edge weights for edges along the path.

In various embodiments, the transformation operation may generate many virtual edges and new in-vertices and new out-vertices, and thus the merge sub-module 204 may be configured to merge the edges, in-vertices and out-vertices to reduce the size of the transformed graph G' to generate a final transformed graph G", which may be a static DAG. For each vertex instance v, a target value d[v] may be defined based on a target function as d[v]=$Target_{min}(P(u, v))$. It may be proven that the merge operation will not affect the target values for any vertex instances.

Figure 3A:
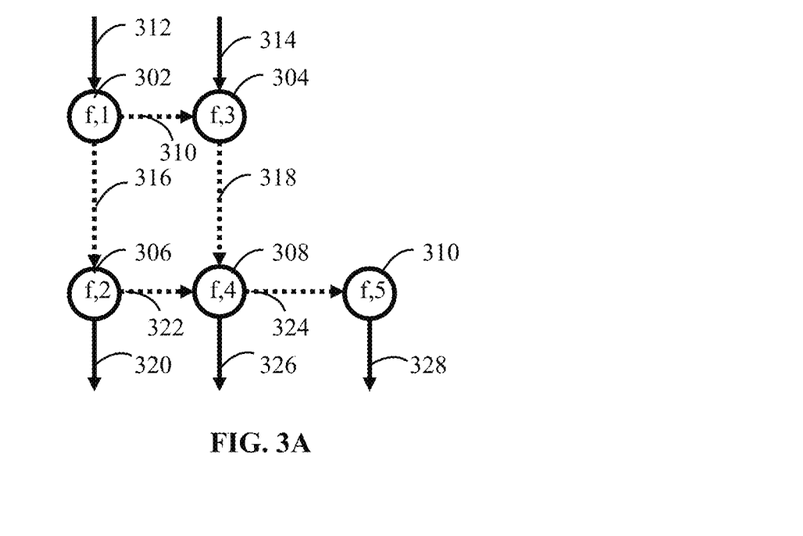
FIG. 3A schematically shows edges and vertices for one vertex instance in accordance with an embodiment of the present disclosure.

FIG. 3A schematically shows edges and vertices for one vertex instance "f" in accordance with an embodiment of the present disclosure. The vertex instance "f" may have two in-vertices 302 and 304. The in-vertex 302 may have an edge 312 coming in at a time instance of one (1), and thus the in-vertex 302 may be labeled as (f, 1). The in-vertex 304 may have an edge 314 coming in at a time instance of three (3), and thus the in-vertex 304 may be labeled as (f, 3). The vertex instance "f" may also have three out-vertices 306, 308 and 310. The out-vertex 306 may have an out edge 320 going out at a time instance of two, and thus the out-vertex 306 may be labeled as (f, 2). The out-vertex 308 may have an out edge 326 going out at a time instance of four (4), and thus the out-vertex 308 may be labeled as (f, 4). The out-vertex 310 may have an out edge 328 going out at a time instance of five (5), and thus the out-vertex 310 may be labeled as (f, 5).

Some vertices in the transformed graph G' may be selected as hub vertices and some other vertices may be merged to these hub vertices. In some embodiments, hub vertices set may be defined as $T_{hub}[u]=\{(u; t): (u; t)\in T_{out}[u];$ and (u; t) is a hub vertex}. An out vertex (u; t) may be selected as a hub vertex by any one of two criteria: 1) the out vertex has the smallest time instance for the vertex instance (e.g., it is an out-vertex having an earlies time instance of all out-vertices of the same vertex instance); and 2) the out vertex has the smallest time instance after the time instance of an in-vertex for the same vertex instance (e.g., it is an out-vertex with the earlies time instance after the time instance of an in-vertex). It should be noted that a hub vertex may satisfy any one of the two criteria or both criteria.

The vertex (f; 2) may be a hub vertex because it has the smallest time instance according to criterion one. The vertex (f; 4) may also be a hub vertex according to criterion two, because there exits an in-vertex (f; 3), and other out-vertices are either earlier than (f; 3) or later than (f; 4). But (f; 5) does not satisfy any criterion, and thus may not be a hub vertex. Thus, $T_{hub}[f]$ for the vertex instance "f" may be {(f; 2); (f; 4)}. It should be noted that the hub vertex (f; 2) may also satisfy criterion two.

Between the in-vertex 302 and the in-vertex 304 may be an edge 310. The edge 310 may be a virtual edge generated according to transformation Rule 2 and illustrated by a dotted line. Between the in-vertex 302 and the out-vertex 306 may be an edge 316. The edge 316 may be a virtual edge generated according to transformation Rule 3 and illustrated by a dotted line. Between the in-vertex 304 and the out-vertex 308 may be an edge 318. The edge 318 may be a virtual edge generated according to transformation Rule 3 and illustrated by a dotted line. Between the out-vertex 306 and the out-vertex 308 may be an edge 322. The edge 322 may be a virtual edge generated according to transformation Rule 2 and illustrated by a dotted line. Between the out-vertex 308 and the out-vertex 310 may be an edge 324. The edge 324 may be a virtual edge generated according to transformation Rule 2 and illustrated by a dotted line.

Figure 3B:
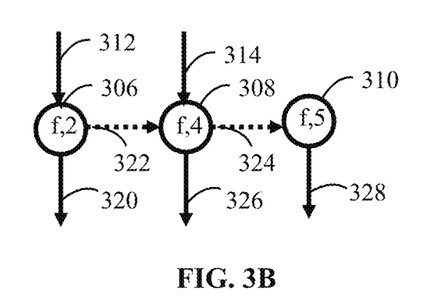
FIG. 3B schematically shows edges and vertices for the vertex instance of FIG. 3A after Merge One in accordance with an embodiment of the present disclosure.

FIG. 3B schematically shows edges and vertices for the vertex instance of FIG. 3A after Merge One in accordance with an embodiment of the present disclosure. Merge One may merge an in-vertex to an earliest out-vertex of the same vertex instance after the in-vertex's time instance. For in-vertex 302, the earliest out-vertex of the same vertex instance after the in-vertex's time instance is out-vertex 306, so the in-vertex 302 may be merged into the out-vertex 306. The in-vertex 302 may be eliminated after the merge and the in edge 312 may directly connect to the out-vertex 306. For in-vertex 304, the earliest out-vertex of the same vertex instance is out-vertex 308 after the in-vertex's time instance, so the in-vertex 304 may be merged into the out-vertex 308. The in-vertex 304 may be eliminated after the merge and the in edge 314 may directly connect to the out-vertex 308. The virtual edges 310, 316 and 318 may also be eliminated after the merge because now the two in-vertices 302 and 304 are now eliminated.

Figure 3C:
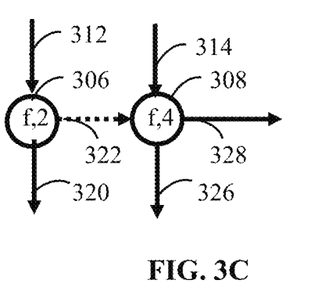
FIG. 3C schematically shows edges and vertices for the vertex instance of FIG. 3A after Merge Two in accordance with an embodiment of the present disclosure.

FIG. 3C schematically shows edges and vertices for the vertex instance of FIG. 3A after Merge Two in accordance with an embodiment of the present disclosure. Merge Two may further consolidate the out-vertices of a vertex instance. As shown in FIG. 3C, the out-vertex 310 may be merged into the out-vertex 308 and eliminated. The out edge 328 may start from the out-vertex 308 after the merge.

The merge operation may follow one merge rule for in-vertices and another merge rule for out-vertices. In one embodiment, for in-vertices, each in-vertex may be merged into the earliest hub vertex of the same vertex instance after the in-vertex's time instance. For out-vertices, an out-vertex may be merged into a hub vertex if the out-vertex and the hub vertex have a same vertex instance and the hub vertex's time instance is the latest of all hub vertices of the same vertex instance before the out-vertex's time instance. The merge rule for in-vertices may be referred to as Merge One (1) and the merge rule for out-vertices may be referred to as Merge Two (2).

Referring back to FIG. 2, the merge sub-module 204 may be configured to perform the merge operation. In general, the topological structure of DAG and the target values of these hub vertices may be unchanged. Because in-vertices may only act as proxy of out-vertices, the in-vertices may be merged to out-vertices in Merge One (1). Moreover, if an out-vertex A only has an edge from another out-vertex B by Rule 2 in transformation, the out-vertex A may be merged into the out-vertex B in Merge Two (2) because their target values are the same.

The merged graph may be denoted as G". The target value of vertex v may be denoted as d[v]|G' for graph G', d[v]|G" for graph G". The target value for any vertex in G" may be the same as the target value for its corresponding vertex in G'. The original edges are the edges exist in original graph G. The virtual edges do not exist in G, and they are generated by following Rule 2 and Rule 3 in transformation. Because the virtual edges do not have weights (w=0), they have no effect on updating the target values. Thus, the final results of all vertices do not change if the topological structure of the graph is reserved. FIG. 3C shows that the original edges 312, 314, 320, 326 and 328 in FIG. 3A may be preserved in the merged graph and the topological order of the graph in FIG. 3A may be maintained.

The speed of graph transformation is very important because any graph computation cannot start before the transformation completes. Various embodiments may include optimization to improve the transformation speed. The merge sub-module 204 may further include sub-modules sort 206, relabel 208 and assemble 209. The sort sub-module 206 and relabel sub-module 208 may provide two optimizations for the merge operation.

All transformation algorithms, including the merge operation in an embodiment may need to sort the vertices for relabeling (i.e., putting all $T_{in}[v]$ and $T_{out}[v]$ in a logical array for helping the execution). The sorting methods in conventional transformation algorithms use common sorting algorithms such as quick sort with a 2-dimension comparison, $(v_1; t_1) < (v_2; t_2)$ if $<v_2$ or $v_1 = v_2$ and $t_1 < t_2$ with the time complexity $O(|E|*\log(D))$. However, all edges are generally already sorted by their starting time in the edge stream. Therefore, the time instances of all out-vertices generated by scanning edges are monotonically increasing, meaning that the second dimension is already sorted. Thus, various embodiments may use a more efficient sorting method by just collecting vertices with the same vertex instances and retaining their original order in the edge stream.

Specifically, in an embodiment, the sort sub-module 206 may implement a sort algorithm that may be configured to scan the edge stream and calculate the set size of $T_{hub}[u]$ for each u in G. Then a cumulative flow diagram may be constructed and used to allocate an array with enough storage space for each hub vertices set. Finally, the sort algorithm of the sub-module 206 may be further configured to scan the edge stream and copy each generated hub vertex to its specific position. The sort algorithm implemented by the sort sub-module 206 may be similar to a radix sort and may be referred to as 2-dimensional radix sort (2-D radix sort), with a time complexity of $O(|E|)$.

The 2-D radix sort may be applied to out-vertices sets only and not to the in-vertices sets because in-vertices sets may not be ordered. Embodiments may generate hub vertices that may be all out-vertices. The traditional transformation has to use classical sorting methods such as quicksort with the time complexity of $O(|E|\log(D))$ and 2-D radix sort in an embodiment may reduce the time complexity to $O(|E|)$.

The relabel sub-module 208 may be configured to perform the relabeling (i.e., putting all $T_{in}[v]$ and $T_{out}[v]$ in a logical array for helping the execution). For each in-vertex, the hub vertex with the minimum time instance no earlier than the in-vertex may need to be found. And for each out-vertex, the corresponding hub vertex has the maximum time instance no later than the out-vertex may need to be found. Both can be found by using binary search. As there are no data dependencies during searching, the search on all in-vertices and all out-vertices may be done in parallel with $O(|E|)$ time complexity. Thus, the relabel sub-module 208 may be configured to perform parallel relabeling in various embodiments.

The assemble sub-module 209 may be configured to assemble the updated edges with newly created edges in the same form of the edge stream. The new edges may also be created with time order so the transformed edge stream may follow the topological order of the DAG. The overall time complexity of edge assembling may be $O(|E|)$.

The static DAG generated by the transformation module 202 may be forwarded to the execution module 210 for providing various solutions, for example, reachability, earliest-arrival path, latest-departure path, fastest path, shortest path. Moreover, based on these minimum temporal path solutions, more complicated applications may be defined. For example, top K nearest neighbors is a more complicated application that may be built on solutions to the shortest path problem. The Top k nearest neighbors refers to find the k-nearest neighbors of a specific vertex. In one embodiment, the computation may consist of two parts: firstly calculating the shortest path for all vertices from a source vertex v; then using a priority queue with size k to find k vertices with the smallest shortest path from the source vertex v.

The transformation module 202 may comprise a single scan sub-module 212. The prefix-optimum path problems on a DAG may have a very nice property that they can be solved by a single scan over all edges according to their topological order which is embedded in edge stream. Given a target function target(P), there must be an update function that can calculate the target value of path P from a prefix and remaining edges. For example, assume that P may be a path from a starting vertex v to an end vertex $v_n$, P' may be the prefix path from the starting vertex v to an intermediate vertex $v_{n-1}$, and $e(v_{n-1}, v_n)$ may be the remaining edge between the intermediate vertex $v_{n-1}$ and the end vertex $v_n$, then target(P)=update(target(P'), $e(v_{n-1}, v_n)$). The target value d[v] may be defined based on the target function as d[v]=$Target_{min}$(P(u, v)).

The single scan sub-module 212 may be configured to perform a single scan operation for all prefix-optimum path problems on transformed graph (DAG). The single scan operation may first initialize the target value d[v] for all vertex instances v to positive infinity (e.g., d[v]=+∞) with the exception of the source vertex u, for which d[u] may be set to zero, and then scan all edges according to their topological order and update the target value of the destination vertex of each edge. After this single scan, the target values of all vertices are the final results.

The API 214 may comprise interfaces based on the edge-centric programming model. In some embodiments, each edge may have five attributes (start_vertex; end_vertex; star_t time; end_time; weight) that may correspond to (start vertex identifier, end vertex identifier, start time, end time, weight for the edge). Each vertex may have attributes (vid; d) with vid for the vertex instance and "d" for the property associated with vertex instance. The property "d" may be associated with the path problem at hand. For example, for a shortest distance path problem, the property "d" may be the shortest distance from source to v. In at least one embodiment, the API 214 may comprise a transform function, an initialization function, a mapping function and an aggregation function as shown in Table One below.

TABLE ONE

APIs in C/C++ language syntax

| Function Name | Inputs to the Function |
|---|---|
| Transform( ) | |
| Vinit($s_{id}$, $F_i$) | $F_i$: = void Function(Vertex& s) |
| EMap($F_u$, $F_t$) | $F_u$, $F_t$ = void Function(Edge& e) |
| VAggre(id, $F_a$) | $F_a$: = void Function(Vertex& a, Vertex& b) |

The transform function may be configured to transform an input temporal graph to a transformed graph (e.g., a DAG), for example, by invoking the transformation module 202. In an embodiment, the transformation may need to be performed only once. The initialization function, which may be referred to as VInit, may be configured to initialize the property of a source vertex. The initialization function may take a mandatory input and an optional input. The mandatory input may be a vertex instance identifier and the optional input may be a user defined initial function. Programmers using the system 200 may define specific initial values by providing an initial function of $F_i$. If the optional second input is not provided when Vinit is invoked, the property of the vertex instance may be set by default to positive infinity (e.g., +∞). Programmers using the system 200 may need to give the source vertex ID in the mandatory input to VInit.

The mapping function, which may be referred to as EMap, may be used to process each edge and modify the properties of corresponding vertices. The mapping function may take two inputs, which may be functions defined by programmers using the system 200. The first input function $F_u$ may be provided by programmers using the system 200 and may process each edge and modify the properties of corresponding vertices. The input parameter for $F_u$ may be an edge. The second input function Ft may be a filter function that keeps the edges whose time instances are between the time interval provided by users.

The pseudo code for execution flow of EMap is shown below.

```
function EMAP(Fu, Ft)
  for edge in Edo
    if F_t(edge)==true then
      F_u(edge)
    End if
  End for
End function
```

The aggregation function, which may be referred to as VAggre, may receive two inputs: a vertex instance (e.g., the vertex ID in the original temporal graph) and a merging function. The aggregation function may be configured to aggregate properties of vertices with the same vertex instance in the original graph using the provided merging function. It should be noted that the merging function in the aggregation function is not the merge operation in the merge sub-module 204. The merge operation in the merge sub-module 204 is for generating a final DAG for the transformation. The merging function in the aggregation function of the API 214 may be different specific merging functions for different particular solutions, for example, different merging functions may be used for reachability, shortest-path, etc.

As an example, pseudo code in C/C++ language syntax for using the system 200 to compute a shortest path may be as follows, in which "←" may be an assignment operator that assigns the value at its right to the variable at its left, ">=" may be larger than or equal, "<=" may be less than or equal to, "&&" may be an AND operator:

```
Input: Start, End, Sid, Did
Output: Shortest path from the source vertex (ID: Sid) to
target vertex (ID: Did)
  def Initial (Vertex& v)
    v.d←+∞
    if v.vid==Sid
      v.d←0
  def Time(Edge& e)
    return e.start_time>=Start && e.end_time<=End
  def Update(a, edge)
    a←edge.start_vertex.d+edge.weight
    if a<edge.end_vertex.d
      edge.end_vertex.d←a
  def Merge(a, b)
    return min(a, b)
  Transform( )
  VInit(Sid, Initial)
  EMap(Update, Time)
  return VAggre(Did, Merge)
```

In the example pseudo code implementation for the shortest path, for VInit function, the property value of the source vertex may be set to 0 and the property value of other vertices may be set to +∞. Moreover, the timing function $F_t$ may filter edges that are not in the time interval (Start; End), and the update function $F_u$ may be similar to traditional shortest path algorithms (e.g., updating the property of destination if the shortest path is found). In the end, the aggregation function VAggre may be invoked to find the shortest path for the target vertex.

Figure 4:
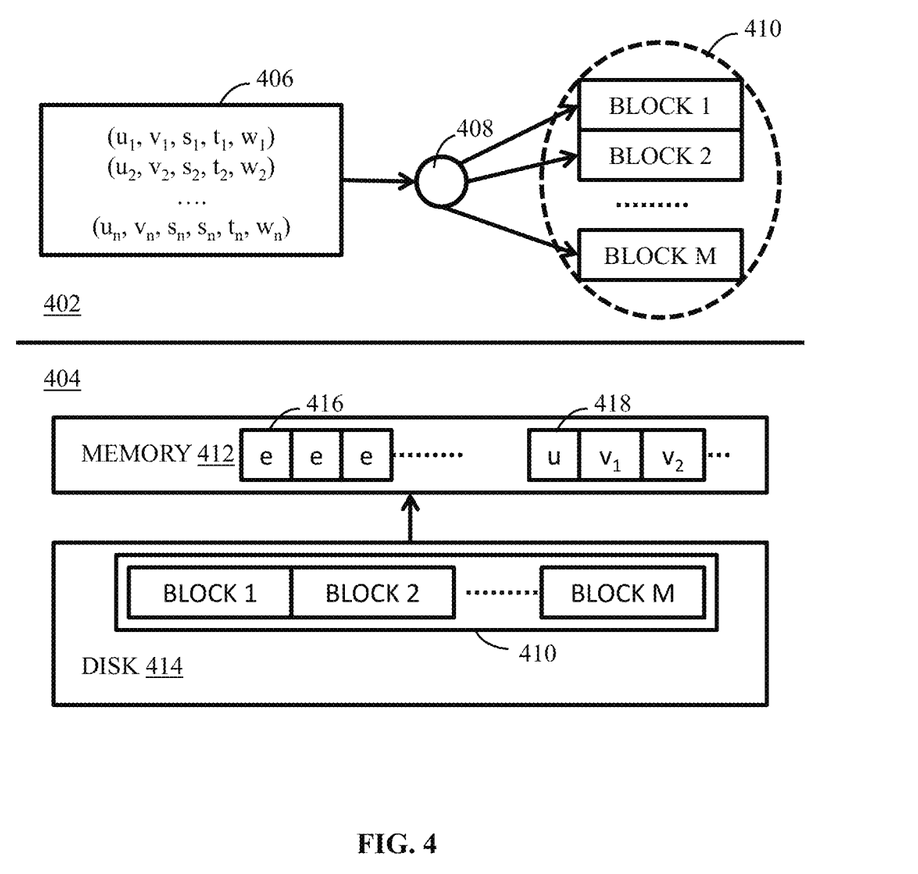
FIG. 4 schematically shows out-of-core computing in accordance with an embodiment of the present disclosure.

FIG. 4 schematically shows out-of-core computing in accordance with an embodiment of the present disclosure. In some embodiments, during a transformation phase 402, an input temporal graph 406 may be transformed in a transformation operation 408 into a DAG 410. The input temporal graph 406 may comprise a plurality of edges $(u_1, v_1, s_1, t_1, w_1)$, $(u_2, v_2, s_2, t_2, w_2)$, through $(u_n, v_n, s_n, s_n, t_n, w_n)$. The transformation operation 408 may be performed by an embodiment of the system 200 and the DAG 410 may be a transformed graph G" generated by an embodiment of the system 200. In at least one embodiment, to support out-of-core graph execution using disks for large graphs, an embodiment of the system 200 may organize the DAG 410 by edges into data blocks. It should be noted that the example input temporal graph 406 may have a cost "w" associated with each edge, such that the input edges may be represented as quintet (u; v; s; t; w). In some embodiments, an input temporal graph may not have costs associated with edges and the input edges may be represented in quintet (u; v; s; t; w).

During an execution phase 404 (e.g., providing services to the user application 218), the DAG 410 may be stored in an out-of-core storage 414 (e.g., a hard drive) and each single data block (e.g., Block 1, Block 2, through Block M) may be loaded into the main memory 412 one by one and each may fit in the main memory 412 (e.g., data block 416 for any one of the Block on disk that may comprise a plurality of edges). An embodiment of the system 200 may load and process each data block during the execution phase 404 to scan all edges according to the order of their starting time and updates the property of their destination vertices. The execution module 210 of an embodiment of the system 200 may process the DAG 410 by loading and processing each data block individually. Because the execution module 210 may implement the single scan sub-module 212, an embodiment of the system 200 may need to scan all edges just once to find the final results and each data block may need to be loaded and processed once.

In at least one embodiment, all vertices of the DAG 410 may be kept in the memory 412 as vertices 418 during the execution phase 404. Random access to each vertex of the vertices 418 may be provided so that property for each vertex may be updated as needed during execution.

Due to the inherent limitations, conventional temporal graph computing approaches have difficulties to adapt to the out-of-core execution (using disks) because they cannot limit their memory usage only holding vertices of the original graph. The shortest path problem is used here to show the limitations in prior art. The conventional static method needs to keep the list vertices (e.g., $L_v$) for values of v such as the shortest distance at different times in memory for each vertex v to quickly query and update each edge. However, the size of lists for all vertices is larger than |E| that can't be held in memory entirely for large graphs.

For the conventional transformation method, Dijkstra's algorithm is applied to the transformed DAG. The algorithm needs to maintain a priority queue to track the computing for each vertex. In each step, the vertex with the current shortest path from the source is popped out from the queue and is used to update its neighbors. The accesses of edges are based on the order of vertices popped out from the priority queue, which leads to a large amount of random access on large scale edges.

Existing state-of-the-art out-of-core static graph computing engines need to work on the transformed DAG considering the time constraints. These systems have high preprocessing overhead to speed up the execution. During execution, they do not have an advantage either because the conventionally transformed DAG has a larger diameter. This makes iterative shortest path algorithms, such as Bellman-Ford widely used in out-of-core graph computing systems, very slow.

Different from the prior art systems, embodiments according to the present disclosure may use the merge operation to reduce the amount of memory needed. And in addition, there is only one sequential pass on the transformed graph, which may reduce the random access on edges and make it friendly to the disk Input/Output (I/O). Embodiments of system 200 may also pipeline the execution and disk I/O because of the single scan. All such efforts may make embodiments according to the present disclosure fit the out-of-core execution.

Figure 5:
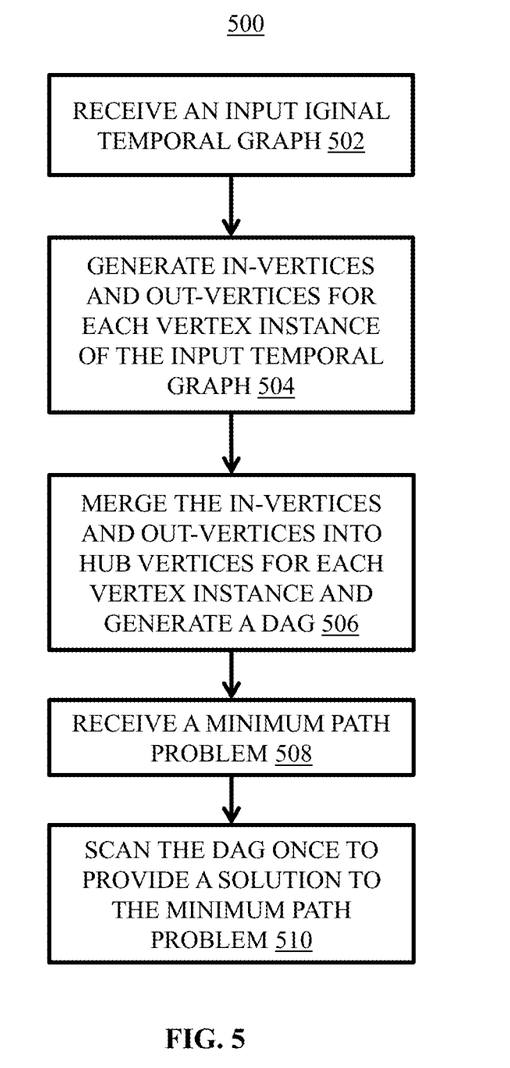
FIG. 5 shows a flow diagram for the transformation of an input temporal graph and execution on the transformed temporal graph in accordance with an embodiment of the present disclosure.

FIG. 5 shows a flow chart for a process 500 to provide a temporal graph computing solution in accordance with an embodiment of the present disclosure. The process 500 may perform a transformation on an input temporal graph and an execution on the transformed temporal graph provide a temporal graph computing solution in accordance with an embodiment of the present disclosure. At block 502, an input temporal graph may be received. For example, an original temporal graph may be input to an embodiment of the system 200 via the API 214. The original temporal graph may have a plurality of edges and each edge may connect one vertex instance of the plurality of vertices (e.g., a start vertex for an edge) to another vertex instance of the plurality of vertices (e.g., an end vertex for an edge).

At block 504, in-vertices and out-vertices for each vertex instance of the plurality of vertices may be generated. In one embodiment of the system 200, each in-vertices and each out-vertices may be generated, for example, by part of the transformation module 202, in the form of (u; t) where u may be the vertex instance and t may be the time instance. At block 506, the in-vertices and the out-vertices may be merged into hub vertices for each vertex instance and a directed acyclic graph (DAG) may be generated. In one embodiment, the merge sub-module 204 may be configured to sort all out-vertices for the plurality of vertices using a 2-dimensional radix sort (e.g., by the sort sub-module 206), generate a respective set of hub vertices for each vertex instance, relabel the in-vertices and the out-vertices to their respective hub vertices for each vertex instance by a parallel binary search and updating edges affected by the relabeling (e.g., by the relabel sub-module 208), and assemble relabeled edges and vertices to generate the DAG (e.g., by the assemble sub-module 209).

At block 508, a minimum path problem may be received, for example, through the API 214 from the user application 218. In at least one embodiment, the minimum path problem may be one of reachability, earliest-arrival path, latest-departure path, fastest path, shortest path and top k nearest neighbor with k being a positive integer. At block 510, the DAG may be scanned once to provide a solution to the minimum path problem, for example, by the execution module 210. In one embodiment, the system 200 may be implemented in software instructions, and the modules and sub-modules may be groupings of software instructions for carrying out respective operations of the process 500.

Figure 6:
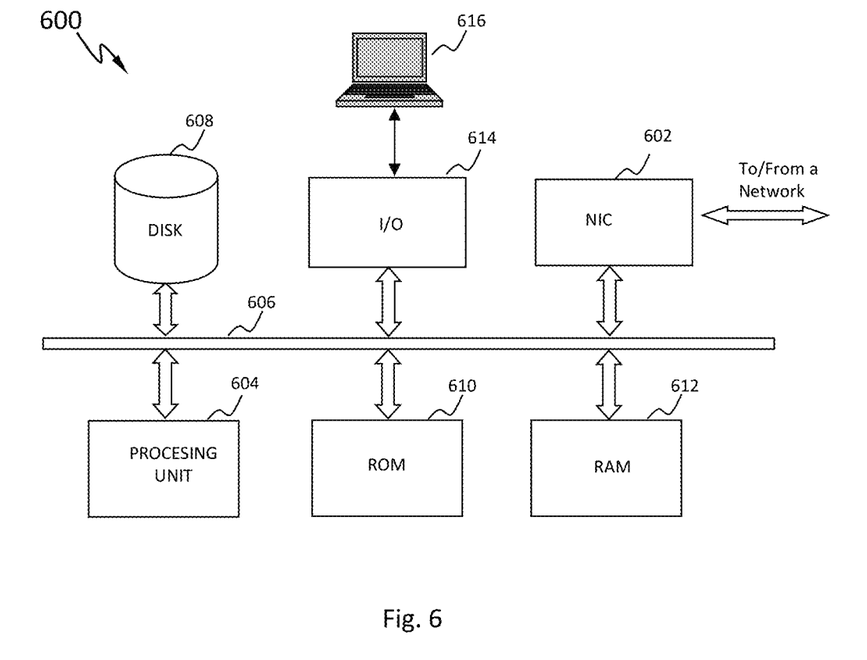
FIG. 6 shows a general computing device in accordance with an embodiment of the present disclosure.

FIG. 6 is a functional block diagram illustration for a computing device 600 on which the present teaching may be implemented. The computing device 600 may be a general-purpose computer or a special purpose computer or a blade in a rack of a data center, including but not limited to, a personal computer, a laptop, a server computer, a tablet, a smartphone. The methods and operations as described herein may each be implemented on one or more embodiments of the computing device 600, via hardware, software program, firmware, or a combination thereof.

The computing device 600, for example, may include one or more NICs 602 connected to and from a network to facilitate data communications. The computing device 600 may also include a processing unit 604. In an embodiment, the processing unit 604 may include a central processing unit (CPU), for example, in the form of one or more processors (e.g., single core or multi-core), for executing software instructions. In an embodiment, the CPU may be optional for the processing unit 604, but the processing unit 604 may comprise other processing units, for example, but not limited to, a Graphics Processing Unit (GPU), an ASIC, or one or more of both. It should be noted that the operations and processes described herein may be performed by a CPU, a GPU, an ASIC, other circuitry or combination of the processing units and circuitry.

The exemplary computer device 600 may further include an internal communication bus 606, program storage and data storage of different forms, e.g., an out-of-core storage such as the non-volatile storage 608 (e.g., conventional hard drive, or a solid state drive), read only memory (ROM) 610, and a main memory such as the random access memory (RAM) 612, for various data files to be processed and/or communicated by the computer, as well as software instructions to be executed by the CPU 604. The computing device 600 may also include an I/O component 614, supporting input/output flows between the computer and other components therein such as user interface elements 616 (which may be optional in a data center for a server machine). The computing device 600 may also receive software program and data via network communications.

In an exemplary embodiment, there is provided a method that may comprise receiving an input temporal graph that have a plurality of edges with each edge connecting from one vertex instance another vertex instance of the plurality of vertices, generating in-vertices and out-vertices for each vertex instance of the plurality of vertices, merging the in-vertices and the out-vertices into hub vertices for each vertex instance and generating a directed acyclic graph (DAG), receiving a minimum path problem, and scanning the DAG once to provide a solution to the minimum path problem. The merging of vertices and generation of the DAG may be performed by sorting all out-vertices for the plurality of vertices using a 2-dimensional radix sort, generating a respective set of hub vertices for each vertex instance, relabeling the in-vertices and the out-vertices to their respective hub vertices for each vertex instance by a parallel binary search and updating edges affected by the relabeling and assembling relabeled edges and vertices to generate the DAG.

In an embodiment, the method may further comprise generating a respective set of hub vertices for each vertex instance by selecting: 1) an out-vertex that has an earliest time instance of all out-vertices of a respective vertex instance, or 2) for each in-vertex, an out-vertex that has an earliest time instance after a time instance of the in-vertex.

In an embodiment, the minimum path problem may be one of reachability, earliest-arrival path, latest-departure path, fastest path, shortest path and top k nearest neighbor with k being a positive integer.

In an embodiment, the method may further comprise determining a target function based on the minimum path problem, defining a target value for each vertex instance based on the target function, initializing target values for all vertex instances to positive infinity except a source vertex instance, scanning all edges in the DAG once according to their topological order, and updating the target values of destination vertex instances of each edge.

In an embodiment, all hub vertices may be out-vertices.

In an embodiment, the method may further comprise organizing the DAG into data blocks for the data blocks to be stored in an out-of-core storage, and loading each data block into a main memory for the scanning to provide the solution.

In an embodiment, the method may further comprise storing all vertices of the DAG in the main memory during the scanning, and updating properties of in-memory vertices with random access.

In another exemplary embodiment, there is provided a computing system that may comprise a main memory for storing software instructions for performing temporal graph computing and a central processing unit (CPU) coupled to the main memory and configured to execute the software instructions to: receive an input temporal graph that have a plurality of edges with each edge connecting from one vertex instance to another vertex instance of a plurality of vertices, generate in-vertices and out-vertices for each vertex instance of the plurality of vertices, merge the in-vertices and the out-vertices into hub vertices for each vertex instance and generate a directed acyclic graph (DAG), receive a minimum path problem and scan the DAG once to provide a solution to the minimum path problem. The vertices may be merged and the DAG may be generated by: sorting all out-vertices for the plurality of vertices using a 2-dimensional radix sort, generating a respective set of hub vertices for each vertex instance, relabeling the in-vertices and the out-vertices to their respective hub vertices for each vertex instance by a parallel binary search and updating edges affected by the relabeling, and assemble relabeled edges and vertices to generate the DAG.

In an embodiment, the CPU executing the software instructions may be further configured to generate a respective set of hub vertices for each vertex instance by selecting: 1) an out-vertex that has an earliest time instance of all out-vertices of a respective vertex instance, or 2) for each in-vertex, an out-vertex that has an earliest time instance after a time instance of the in-vertex.

In an embodiment, the minimum path problem may be one of reachability, earliest-arrival path, latest-departure path, fastest path, shortest path and top k nearest neighbor with k being a positive integer.

In an embodiment, the CPU executing the software instructions may be further configured to: determine a target function based on the minimum path problem, define a target value for each vertex instance based on the target function, initialize target values for all vertex instances to positive infinity except a source vertex instance, scan all edges in the DAG once according to their topological order, and update the target values of destination vertex instances of each edge.

In an embodiment, all hub vertices may be out-vertices.

In an embodiment, the computing system may further comprise an out-of-core storage, and the CPU executing the software instructions may be further configured to: organize the DAG into data blocks for the data blocks to be stored in the out-of-core storage, and load each data block into the main memory for the scanning to provide the solution.

In an embodiment, the CPU executing the software instructions may be further configured to: store all vertices of the DAG in the main memory during the scanning, and update properties of in-memory vertices with random access.

In yet another exemplary embodiment, there is provided one or more computer-readable non-transitory media comprising one or more instructions that when executed by one or more processors is to configure the one or more processors to perform operations comprising: receiving an input temporal graph that have a plurality of edges with each edge connecting from one vertex instance another vertex instance of the plurality of vertices, generating in-vertices and out-vertices for each vertex instance of the plurality of vertices, merging the in-vertices and the out-vertices into hub vertices for each vertex instance and generating a directed acyclic graph (DAG), receiving a minimum path problem, and scanning the DAG once to provide a solution to the minimum path problem. The merging of vertices and generation of the DAG may be performed by sorting all out-vertices for the plurality of vertices using a 2-dimensional radix sort, generating a respective set of hub vertices for each vertex instance, relabeling the in-vertices and the out-vertices to their respective hub vertices for each vertex instance by a parallel binary search and updating edges affected by the relabeling and assembling relabeled edges and vertices to generate the DAG.

In an embodiment, the one or more software instructions when executed by the one or more processors is to further configure the one or more processors to cause further performance of temporal graph operations comprising: generating a respective set of hub vertices for each vertex instance by selecting: 1) an out-vertex that has an earliest time instance of all out-vertices of a respective vertex instance, or 2) for each in-vertex, an out-vertex that has an earliest time instance after a time instance of the in-vertex.

In an embodiment, the minimum path problem may be one of reachability, earliest-arrival path, latest-departure path, fastest path, shortest path and top k nearest neighbor with k being a positive integer.

In an embodiment, the one or more software instructions when executed by the one or more processors is to further configure the one or more processors to cause further performance of temporal graph operations comprising: determining a target function based on the minimum path problem, defining a target value for each vertex instance based on the target function, initializing target values for all vertex instances to positive infinity except a source vertex instance, scanning all edges in the DAG once according to their topological order and updating the target values of destination vertex instances of each edge.

In an embodiment, the one or more software instructions when executed by the one or more processors is to further configure the one or more processors to cause further performance of temporal graph operations comprising: organizing the DAG into data blocks for the data blocks to be stored in an out-of-core storage; and loading each data block into a main memory for the scanning to provide the solution.

In an embodiment, the one or more software instructions when executed by the one or more processors is to further configure the one or more processors to cause further performance of temporal graph operations comprising: storing all vertices of the DAG in the main memory during the scanning, and updating properties of in-memory vertices with random access.

Hence, aspects of the system and method for temporal graph computing, as outlined above, may be embodied in programming (e.g., software instructions). Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the computer-implemented method.

All or portions of the computer-implemented method may at times be communicated through a network such as the Internet or various other telecommunication networks. Such communications, for example, may enable loading of the software from one computer or processor into another. Thus, another type of media that may bear the elements of the computer-implemented method includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the computer-implemented method. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-transitory storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing description and drawings represent embodiments of the present teaching, it will be understood that various additions, modifications, and substitutions may be made therein without departing from the spirit and scope of the principles of the present teaching as defined in the accompanying claims. One skilled in the art will appreciate that the present teaching may be used with many modifications of form, structure, arrangement, proportions, materials, elements, and components and otherwise, used in the practice of the disclosure, which are particularly adapted to specific environments and operative requirements without departing from the principles of the present teaching. For example, although the implementation of various components described above may be embodied in a hardware device, it can also be implemented as a firmware, firmware/software combination, firmware/hardware combination, or a hardware/firmware/software combination. The presently disclosed embodiments are therefore to be considered in all respects as illustrative and not restrictive, the scope of the present teaching being indicated by the following claims and their legal equivalents, and not limited to the foregoing description.

What is claimed is:

1. A method for performing temporal graph computing, comprising:
receiving an input temporal graph that have a plurality of edges, each edge connecting from one vertex instance of a plurality of vertices to another vertex instance of the plurality of vertices;
generating in-vertices and out-vertices for each vertex instance of the plurality of vertices;
merging the in-vertices and the out-vertices into hub vertices for each vertex instance and generating a directed acyclic graph (DAG) by:
sorting all out-vertices for the plurality of vertices using a 2-dimensional radix sort;
generating a respective set of hub vertices for each vertex instance;
relabeling the in-vertices and the out-vertices to their respective hub vertices for each vertex instance by a parallel binary search and updating edges affected by the relabeling; and
assembling relabeled edges and vertices to generate the DAG;
receiving a minimum path problem; and
scanning the DAG once to provide a solution to the minimum path problem.

2. The method of claim 1, further comprising generating a respective set of hub vertices for each vertex instance by selecting: 1) an out-vertex that has an earliest time instance of all out-vertices of a respective vertex instance, or 2) for each in-vertex, an out-vertex that has an earliest time instance after a time instance of the in-vertex.

3. The method of claim 1, wherein the minimum path problem is one of reachability, earliest-arrival path, latest-departure path, fastest path, shortest path and top k nearest neighbor with k being a positive integer.

4. The method of claim 3, further comprising:
determining a target function based on the minimum path problem;
defining a target value for each vertex instance based on the target function;
initializing target values for all vertex instances to positive infinity except a source vertex instance;
scanning all edges in the DAG once according to their topological order; and
updating the target values of destination vertex instances of each edge.

5. The method of claim 1, wherein all hub vertices are out-vertices.

6. The method of claim 1, further comprising:
organizing the DAG into data blocks for the data blocks to be stored in an out-of-core storage; and
loading each data block into a main memory for the scanning to provide the solution.

7. The method of claim 6, further comprising: storing all vertices of the DAG in the main memory during the scanning, and updating properties of in-memory vertices with random access.

8. A computing system, comprising:
a main memory for storing software instructions for performing temporal graph computing; and
a central processing unit (CPU) coupled to the main memory and configured to execute the software instructions to:
receive an input temporal graph that have a plurality of edges, each edge connecting from one vertex instance of a plurality of vertices to another vertex instance of the plurality of vertices;
generate in-vertices and out-vertices for each vertex instance of the plurality of vertices;
merge the in-vertices and the out-vertices into hub vertices for each vertex instance and generate a directed acyclic graph (DAG) by:
sorting all out-vertices for the plurality of vertices using a 2-dimensional radix sort;
generating a respective set of hub vertices for each vertex instance;
relabeling the in-vertices and the out-vertices to their respective hub vertices for each vertex instance by a parallel binary search and updating edges affected by the relabeling; and
assemble relabeled edges and vertices to generate the DAG;
receive a minimum path problem; and
scan the DAG once to provide a solution to the minimum path problem.

9. The computing system of claim 8, wherein the CPU executing the software instructions is further configured to generate a respective set of hub vertices for each vertex instance by selecting: 1) an out-vertex that has an earliest time instance of all out-vertices of a respective vertex instance, or 2) for each in-vertex, an out-vertex that has an earliest time instance after a time instance of the in-vertex.

10. The computing system of claim 8, wherein the minimum path problem is one of reachability, earliest-arrival path, latest-departure path, fastest path, shortest path and top k nearest neighbor with k being a positive integer.

11. The computing system of claim 10, wherein the CPU executing the software instructions is further configured to:
determine a target function based on the minimum path problem;
define a target value for each vertex instance based on the target function;
initialize target values for all vertex instances to positive infinity except a source vertex instance;
scan all edges in the DAG once according to their topological order; and
update the target values of destination vertex instances of each edge.

12. The computing system of claim 8, wherein all hub vertices are out-vertices.

13. The computing system of claim 8, further comprising an out-of-core storage, wherein the CPU executing the software instructions is further configured to:
organize the DAG into data blocks for the data blocks to be stored in the out-of-core storage; and
load each data block into the main memory for the scanning to provide the solution.

14. The computing system of claim 13, wherein the CPU executing the software instructions is further configured to: store all vertices of the DAG in the main memory during the scanning, and update properties of in-memory vertices with random access.

15. One or more computer-readable non-transitory media comprising one or more software instructions that when executed by one or more processors is to configure the one or more processors to cause performance of temporal graph operations comprising:

receiving an input temporal graph that have a plurality of edges, each edge connecting from one vertex instance of a plurality of vertices to another vertex instance of the plurality of vertices;

generating in-vertices and out-vertices for each vertex instance of the plurality of vertices;

merging the in-vertices and the out-vertices into hub vertices for each vertex instance and generating a directed acyclic graph (DAG) by:
  sorting all out-vertices for the plurality of vertices using a 2-dimensional radix sort;
  generating a respective set of hub vertices for each vertex instance;
  relabeling the in-vertices and the out-vertices to their respective hub vertices for each vertex instance by a parallel binary search and updating edges affected by the relabeling; and
  assembling relabeled edges and vertices to generate the DAG;

receiving a minimum path problem; and scanning the DAG once to provide a solution to the minimum path problem.

16. The computer-readable non-transitory media of claim 15, wherein the one or more software instructions when executed by the one or more processors is to further configure the one or more processors to cause further performance of temporal graph operations comprising generating a respective set of hub vertices for each vertex instance by selecting: 1) an out-vertex that has an earliest time instance of all out-vertices of a respective vertex instance, or 2) for each in-vertex, an out-vertex that has an earliest time instance after a time instance of the in-vertex.

17. The computer-readable non-transitory media of claim 15, wherein the minimum path problem is one of reachability, earliest-arrival path, latest-departure path, fastest path, shortest path and top k nearest neighbor with k being a positive integer.

18. The computer-readable non-transitory media of claim 17, wherein the one or more software instructions when executed by the one or more processors is to further configure the one or more processors to cause further performance of temporal graph operations comprising:
  determining a target function based on the minimum path problem;
  defining a target value for each vertex instance based on the target function;
  initializing target values for all vertex instances to positive infinity except a source vertex instance;
  scanning all edges in the DAG once according to their topological order; and
  updating the target values of destination vertex instances of each edge.

19. The computer-readable non-transitory media of claim 15, wherein the one or more software instructions when executed by the one or more processors is to further configure the one or more processors to cause further performance of temporal graph operations comprising:
  organizing the DAG into data blocks for the data blocks to be stored in an out-of-core storage; and
  loading each data block into a main memory for the scanning to provide the solution.

20. The computer-readable non-transitory media of claim 19, wherein the one or more software instructions when executed by the one or more processors is to further configure the one or more processors to cause further performance of temporal graph operations comprising: storing all vertices of the DAG in the main memory during the scanning, and updating properties of in-memory vertices with random access.

* * * * *